(12) United States Patent
Thierman

(10) Patent No.: US 7,589,824 B2
(45) Date of Patent: Sep. 15, 2009

(54) SURFACE CURVATURE MEASUREMENT TOOL

(75) Inventor: Jonathan S. Thierman, Baltimore, MD (US)

(73) Assignee: Sure-Shot Medical Device, Inc., Reno, NV (US)

( * ) Notice: Subject to any disclaimer, the term of this patent is extended or adjusted under 35 U.S.C. 154(b) by 2 days.

(21) Appl. No.: 11/805,257

(22) Filed: May 22, 2007

(65) Prior Publication Data

US 2008/0289205 A1 Nov. 27, 2008

(51) Int. Cl.
G01C 3/08 (2006.01)
(52) U.S. Cl. ...................................... 356/3.01
(58) Field of Classification Search ........... 356/3.01–22
See application file for complete search history.

(56) References Cited

U.S. PATENT DOCUMENTS

| | | | |
|---|---|---|---|
| 1,971,628 A | 8/1934 | Sutterlin | |
| 2,203,984 A | 6/1940 | Deters | |
| 2,365,353 A | 12/1944 | Morris | |
| 2,391,020 A | 12/1945 | Jackman | |
| 2,408,672 A | 10/1946 | Mennesson | |
| 2,655,771 A | 10/1953 | Kline | |
| 2,693,645 A | 11/1954 | Musser et al. | |
| 2,855,687 A | 10/1958 | Price | |
| 3,173,211 A | 3/1965 | Williams | |
| 3,439,430 A | 4/1969 | Harris | |
| 3,486,236 A | 12/1969 | Bennett | |
| 4,049,954 A * | 9/1977 | Da Costa Vieira et al. | .. 702/157 |
| 4,416,063 A | 11/1983 | Nestor | |
| 4,729,174 A | 3/1988 | Caron et al. | |
| 4,903,413 A * | 2/1990 | Bellwood | ..................... 33/551 |
| 5,077,908 A | 1/1992 | Moore | |
| 5,090,811 A * | 2/1992 | Donaldson | .................. 356/606 |
| 5,154,003 A | 10/1992 | Moore | |

(Continued)

FOREIGN PATENT DOCUMENTS

JP 2001 317907 11/2001

*Primary Examiner*—Thomas H Tarcza
*Assistant Examiner*—Luke D Ratcliffe
(74) *Attorney, Agent, or Firm*—Hamilton, Brook, Smith & Reynolds, P.C.

(57) ABSTRACT

A device for measuring the radius of curvature of a surface comprises a main body that is held above the surface being measured; and a non-contact sensor mounted to the main body that measures a distance between the surface being measured and the sensor, the device calculating the radius of curvature of the surface based on the measured distance. The device can further include a display mounted to the main body that displays the calculated radius of curvature. The non-contact sensor can be, for example, an acoustical distance sensor or an optical distance sensor. In one embodiment, the device includes two arms extending from the main body of the device and being substantially symmetric about the non-contact sensor, the arms terminating in contact points that make contact with the surface being measured. In another embodiment, the device includes three non-contact sensors mounted to the main body, each measuring a distance between the surface being measured and the respective sensor, the device calculating the radius of curvature of the surface based on the measured distances. In yet another aspect of the invention, a radius of curvature measuring device has an adjustable arm that is movable with respect to a main body and a linear encoder associated with the adjustable arm for measuring a distance from the surface of interest.

13 Claims, 6 Drawing Sheets

U.S. PATENT DOCUMENTS

| | | |
|---|---|---|
| 5,309,212 A | 5/1994 | Clark |
| 5,337,485 A | 8/1994 | Chien |
| 5,874,719 A | 2/1999 | Hippenmeyer et al. |
| 5,967,990 A | 10/1999 | Thierman et al. |
| 6,079,113 A | 6/2000 | Helmrichs |
| 6,272,762 B1 * | 8/2001 | Kinast et al. .................. 33/550 |
| 6,624,899 B1 | 9/2003 | Clark |
| 6,765,393 B2 | 7/2004 | Pierenkemper et al. |
| 2007/0058155 A1 * | 3/2007 | Booker ...................... 356/5.02 |

* cited by examiner

SURFACE CURVATURE MEASUREMENT TOOL

BACKGROUND OF THE INVENTION

Mechanical gauges for measuring the radius of curvature of curved surfaces are known. Generally, these devices require at least three points of contact on the surface being measured, and mechanical adjustment of the geometry of the device, such as the length of one or more contact probes, in order to measure the radius of curvature of the surface. These mechanical adjustments take time and can negatively affect the accuracy and precision of measurements.

SUMMARY OF THE INVENTION

A device for measuring the radius of curvature of a surface comprises a main body that is held above the surface being measured; and a non-contact sensor mounted to the main body that measures a distance between the surface being measured and the sensor, the device calculating the radius of curvature of the surface based on the measured distance. The device can further include a display mounted to the main body that displays the calculated radius of curvature.

In certain embodiments, the non-contact sensor can comprise an acoustical distance sensor. For an acoustical distance sensor, the distance can be calculated using the roundtrip time-of-flight of a transmitted, reflected, and then received acoustical wave. In other embodiments, the non-contact sensor can comprise an optical distance sensor, that uses, for example, time-of-flight, triangulation, modulated beam, or interferometery methods for measuring distance. The device can comprise a transmitter for transmitting a visible light beam, such as a laser guidance beam, from a point near or at the non-contact sensor in order to provide visual confirmation of the surface being measured.

According to one embodiment, the device for measuring the radius of curvature of a surface comprises two arms extending from the main body of the device and being substantially symmetric about a non-contact sensor, the arms terminating in contact points that make contact with the surface being measured. The arms can define a distance, $d_1$, and an angle, $a$, having known values, and the non-contact sensor measures a distance $d_2$, and calculates the radius of curvature (R) of the surface in accordance with the following equation:

$$R = (2 d_1 d_2 \cos(a) - d_1^2 - d_2^2)/(2d_1 \cos(a) - 2d_2).$$

According to other embodiments, the device for measuring the radius of curvature of a surface comprises a plurality of non-contact sensors mounted to the main body, each measuring a distance between the surface being measured and the respective sensor, the device calculating the radius of curvature of the surface based on the measured distances. The device can include, for example, three non-contact sensors mounted to the main body, each sensor measuring a distance to a different point on the surface being measured. The measured distances can then be used to calculate the radius of curvature of the surface being measured.

For example, the device can comprise a central non-contact sensor mounted to the main body and a pair of peripheral non-contact sensors mounted to the main body at an angle $a$ relative to the central sensor and symmetric with respect to the main sensor. The sensors can be used to measure the distances $(d_1, d_2, d_3)$ of three lines extending from respective points $[(x_1, y_1), (x_2, y_2), (x_3, y_3)]$ on the surface of interest and converging at a point P. With the values of these distances $(d_1, d_2, d_3)$ and the angles between the lines either known or measured values, the location of points $(x_1, y_1), (x_2, y_2), (x_3, y_3)$ can be determined relative to P, and the radius of curvature of the surface can be calculated from the equation of the circle containing points $(x_1, y_1), (x_2, y_2)$ and $(x_3, y_3)$.

A partially non-contact and a fully non-contact radius of curvature measurement devices are described which rely on a non-contact method to measure at least one distance from the measurement device to a surface being measured, the at least one measured distance being used to determine the radius of curvature of the surface. The applications for the device can include, for example, tolerance testing for industrial manufacturing applications, tolerance testing for commercial products in such fields as aviation (e.g., curvature of the leading edge of an airplane wing) and automotive (e.g., curvature of body molding, engine castings, etc.), architectural/construction for measuring tolerances or surfaces of a structure (e.g., buildings, bridges, etc.), and other measurements in architecture, industrial design and product design, as well as educational uses as a classroom learning tool.

Yet another embodiment of a radius of curvature measuring device comprises a main body and an adjustable arm with a linear encoder for accurately measuring a distance from the surface being measured. The device can comprise two peripheral arms extending from the main body of the device and being substantially symmetric about an adjustable central arm, the three arms terminating in contact points that make contact with the surface being measured. The peripheral arms can define a distance, $d_1$, and an angle, $a$, having known values, and the adjustable arm is cooperatively associated with a linear encoder to measure a distance $d_2$, and calculate the radius of curvature (R) of the surface in accordance with the following equation:

$$=(2 d_1 d_2 \cos(a) - d_1^2 - d_2^2)/(2d_1 \cos(a) - 2d_2).$$

The calculated radius of curvature can then be displayed on display, which can be, for example, an LCD display.

The advantages of the measurement tools of the present invention include, for example, increased accuracy and sensitivity of radius of curvature measurements; minimal or even no contact with the surface being measured; an expanded range of radii of curvature that can be measured; and ease of use in obtaining and reading measurements.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
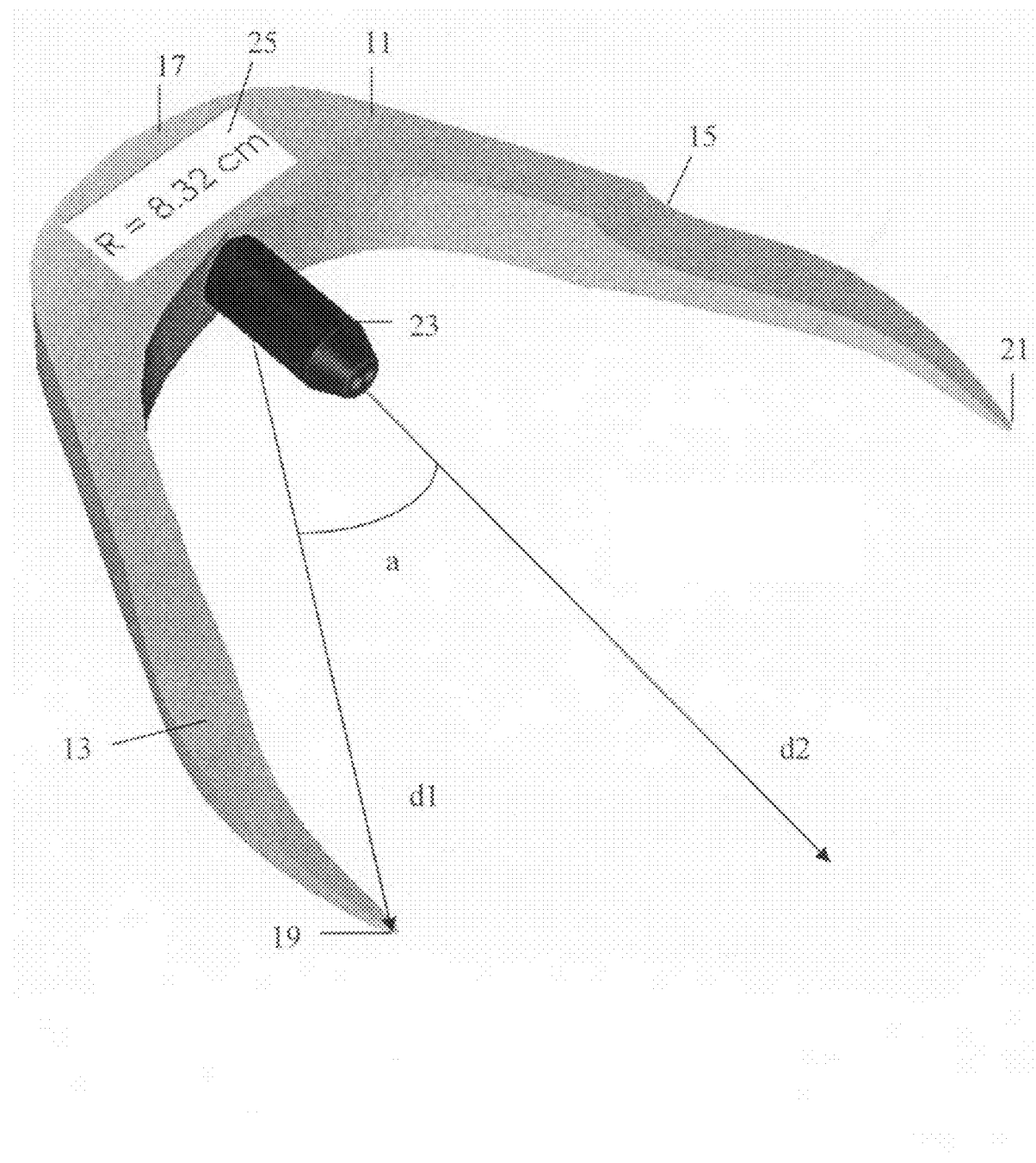
FIG. 1 is a perspective view of a first embodiment of a radius of curvature measuring device having one non-contact sensor.

A first embodiment of a device for measuring the radius of curvature of a surface is shown in FIG. 1. The device comprises a main body 11 having two symmetrical arms 13, 15 extending out from a middle portion 17 to form a substantially "U-shaped" or "V-shaped" structure. The arms 13, 15 are preferably tapered over at least a portion of their length and terminate in contact points 19 and 21. The device also comprises a transmitter and receiver unit 23 that is located on the middle portion 17 of the device between the two arms 13, 15. The operation of the transmitter/receiver unit 23 will be described in further detail below. A display 25, such as an LCD screen, is located on the main body 11, preferably on a flat side surface of the middle portion 17 of the main body 11. The main body 11 can also include controls, such as an on/off button, a reset button and a memory record/recall button. Preferably, the main body 11 and/or the transmitter/receiver unit 23 includes a power source, such as a battery or photovoltaic cells, and circuitry for calculating and displaying radius of curvature measurements.

In order to measure the radius of curvature of a surface, theoretically one only needs to determine the intersection point of two lines running perpendicular to the surface in order to measure the radius of curvature of a particular patch of the surface (this assumes a constant radius of curvature over the patch being measured). However, in practice, ensuring that a line runs perpendicular to the tangent of a curved surface is difficult.

Figure 2:
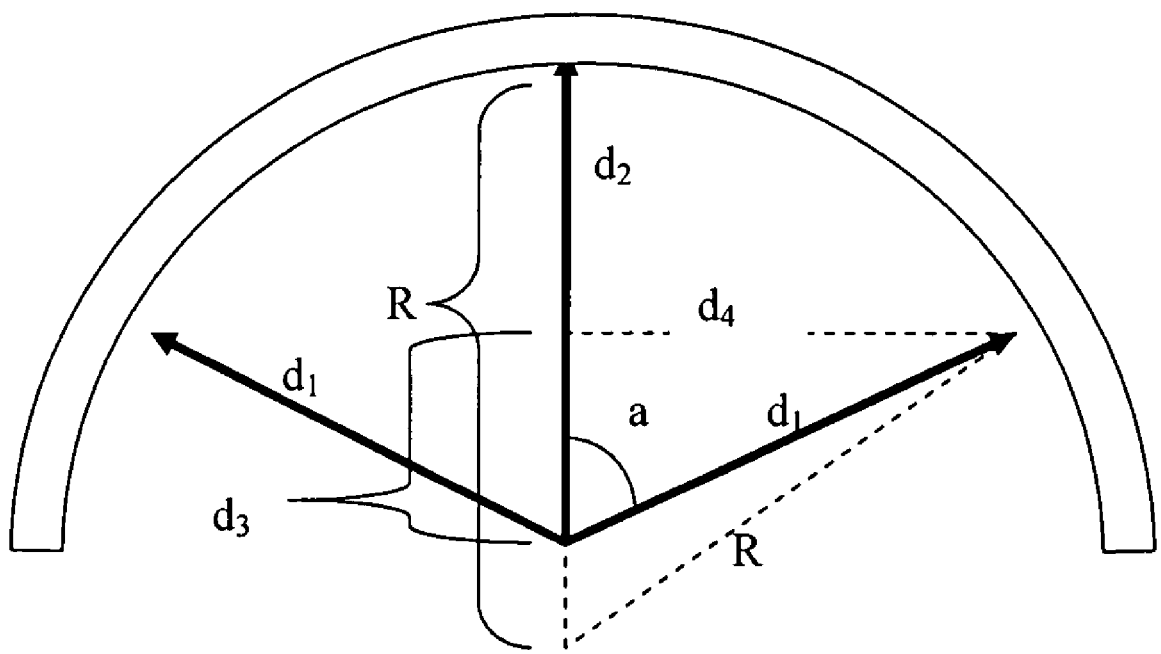
FIG. 2 is a schematic illustration of a first technique for measuring the radius of a curved surface.
Figure 2:
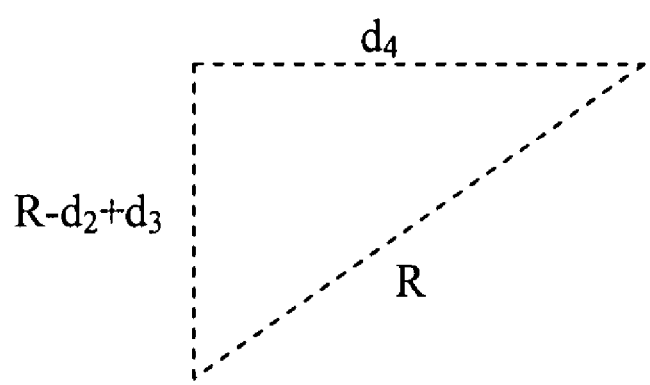

One way of overcoming this difficulty is to determine the intersection point of three lines running from the curved surface in order to establish a true normal (perpendicular line to the surface) by utilizing symmetry and assuming a constant radius of curvature over the patch of surface measured. In the schematic illustration of FIG. 2, two arms of equal length, $d_1$, are brought into contact with a curved surface having an unknown radius of curvature, R. Because the arms have equal length, this ensures that the line bisecting the arms, having length d2 and at angle a relative to the arms, lies perpendicular to the surface by symmetry. The values of $d_1$, $d_2$ and a are known or can be measured. The value of R, the radius of curvature, is solved as follows in terms of these three quantities:

$$\sin(a) = d_4/d_1$$
$$d_4 = d_1 \sin(a)$$
$$d_3 = d_1 \cos(a)$$
$$R^2 = d_4^2 + (R - d_2 + d_3)^2$$
$$= d_1^2\sin^2(a) + (R - d_2 + d_1\cos(a))^2$$
$$= d_1^2\sin^2(a) + \begin{bmatrix} R^2 - Rd_2 + Rd_1\cos(a) - Rd_2 + \\ d_2^2 - d_1d_2\cos(a) + Rd_1\cos(a) - \\ d_1d_2\cos(a) + d_1^2\cos^2(a) \end{bmatrix}$$

which simplifies to:

$$d_2^2 + d_1^2 - 2d_1d_2\cos(a) + (2d_1\cos(a) - 2d_2)R = 0$$

and solving for R:

$$R = (2d_1d_2\cos(a) - d_1^2 - d_2^2)/(2d_1\cos(a) - 2d_2) \quad \text{(Equation 1)}$$

The above calculations solve for the value of the radius of curvature, R, in terms of the lengths, $d_1$ and $d_2$, and the angle, a. Thus, by designing a measurement tool in which two of these values are fixed and the third value can be measured, the radius of curvature for a surface can be determined.

In the embodiment shown in FIG. 1, the measurement tool is designed such that the values of $d_1$ and a are known quantities, and the value of $d_2$ is measured to determine the radius of curvature of a surface. As is shown in FIG. 1, $d_1$ is the distance of the line connecting contact point 19 at the end of arm 13 and the base of the transmitter and receiver unit 23. Angle a is the angle between this line and the longitudinal axis of the transmitter and receiver unit 23. The values of $d_1$ and a are known properties of the measurement tool. The value of $d_2$ is measured by the transmitter and receiver unit 23.

To perform a measurement, the tool is brought into contact with a surface such that the contact points 19 and 21 form two points of contact with the surface and the transmitter and receiver unit 23 is aligned over the surface being measured. Because of the symmetry of the arms 13, 15 with respect to the transmitter and receiver unit 23, the unit 23 will be oriented perpendicular to the surface being measured, assuming a constant radius of curvature between contact points 19 and 21. The transmitter and receiver unit 23 measures the distance to the surface. This value can then be sent to an electronic circuit or other electronic processor that is programmed to calculate a value, R, in accordance with Equation 1, above. This calculated value of R can then be displayed on display 25, as shown in FIG. 1.

An advantage of this embodiment is that the measuring device has limited contact with the surface being measured. This can be significant in terms of limiting possible damage or hazards in connection with the measurement of delicate, sterile or hazardous objects. Only two points-of-contact with the surface being measured are needed, and no adjustments of the lengths or angles of the arms are necessary, thus saving time and making the radius measuring tool very easy to use. In addition, non-contact sensors can be extremely precise, which improves the accuracy of the measuring device. Moreover, in the non-contact distance sensor, there are generally no moving parts that can wear and eventually compromise accuracy.

The transmitter and receiver unit 23 can comprise any suitable non-contact distance measuring device. The non-contact sensor can utilize, for example, acoustic or optical methods to measure distance. An acoustical distance sensor typically generates an acoustical wave and calculates the distance based on the roundtrip time-of-flight of a wave that is transmitted from a transmitter, reflected off of the surface being measured, and then received at a receiver. For an optical distance sensor, there are a number of known techniques for measuring distances, including time-of-flight, triangulation, modulated beam, and interferometery methods. An example of a non-contact optical sensor using a laser triangulation method is described in U.S. Pat. No. 6,624,899 to Clark, the entire teachings of which are incorporated herein by reference. Additional examples of non-contact optical distance measuring methods and devices are described in U.S. Pat. No. 5,309,212 to Clark, U.S. Pat. No. 5,874,719 to Hippenmeyer, et al., and U.S. Pat. No. 6,765,393 to Pierenkemper, et al., the entire teachings of all of which are incorporated herein by reference.

Whether the transmitter and receiver unit 23 employs acoustic or optical means for non-contact distance measurement, in all cases it is preferred that the unit 23 include a transmitter for transmitting a laser guidance beam from the non-contact measurement point in order to provide visual confirmation of the surface being measured.

Figure 3:
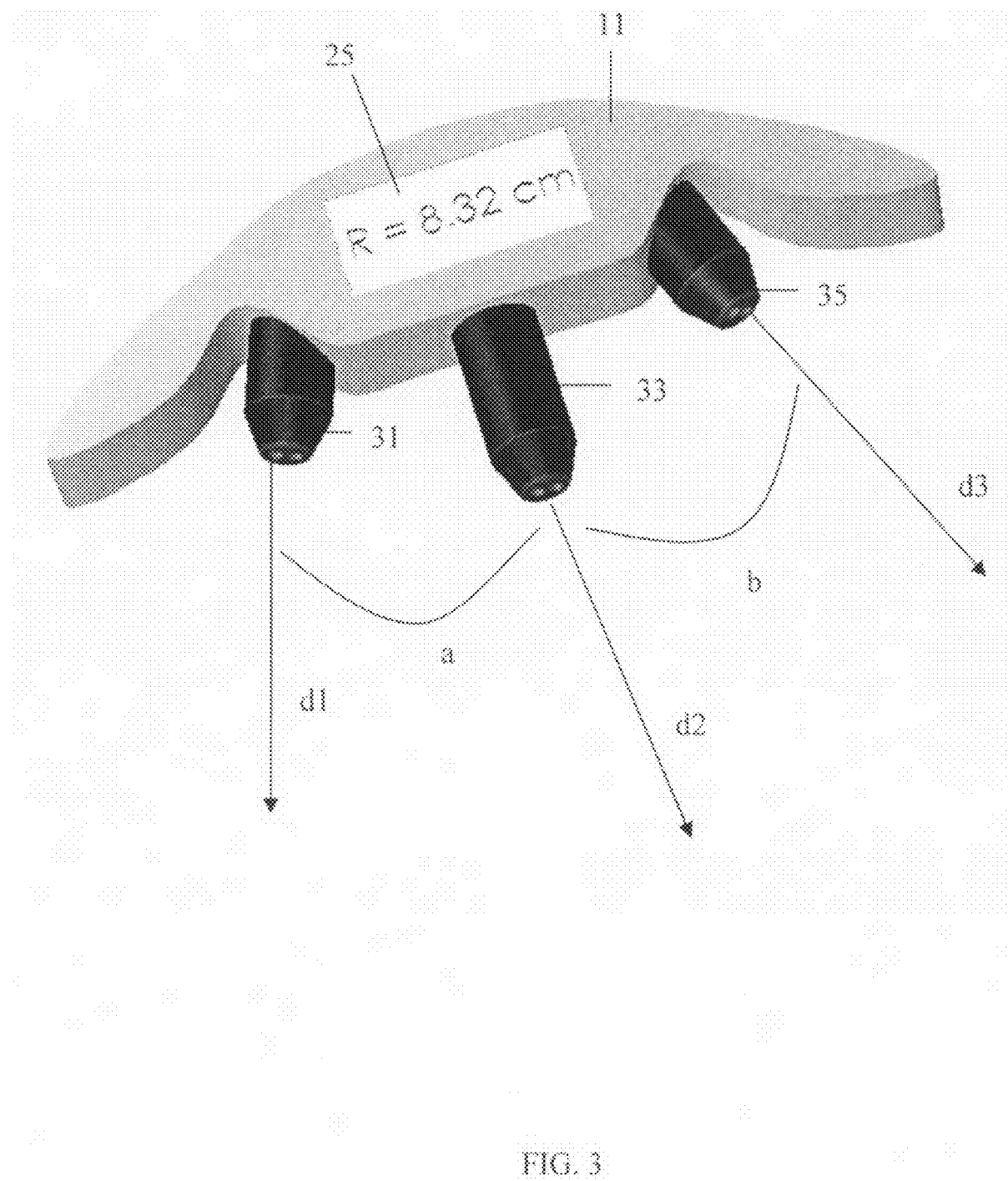
FIG. 3 is a perspective view of a second embodiment of a radius of curvature measuring device having three non-contact sensors.

Turning now to FIG. 3, a second embodiment of a device for measuring the radius of curvature of a surface is shown. As with the device of FIG. 1, this device comprises a main body 11, but does not include two arms having contact points. Instead, this device is a fully non-contact radius of curvature measuring device that comprises three separate transmitter and receiver units 31, 33, 35 for measuring three separate distances from the surface being measured. As with the embodiment of FIG. 1, the apparatus includes a display 25 on the main body 11, and can also include suitable, controls, circuitry and a power source.

Figure 4:
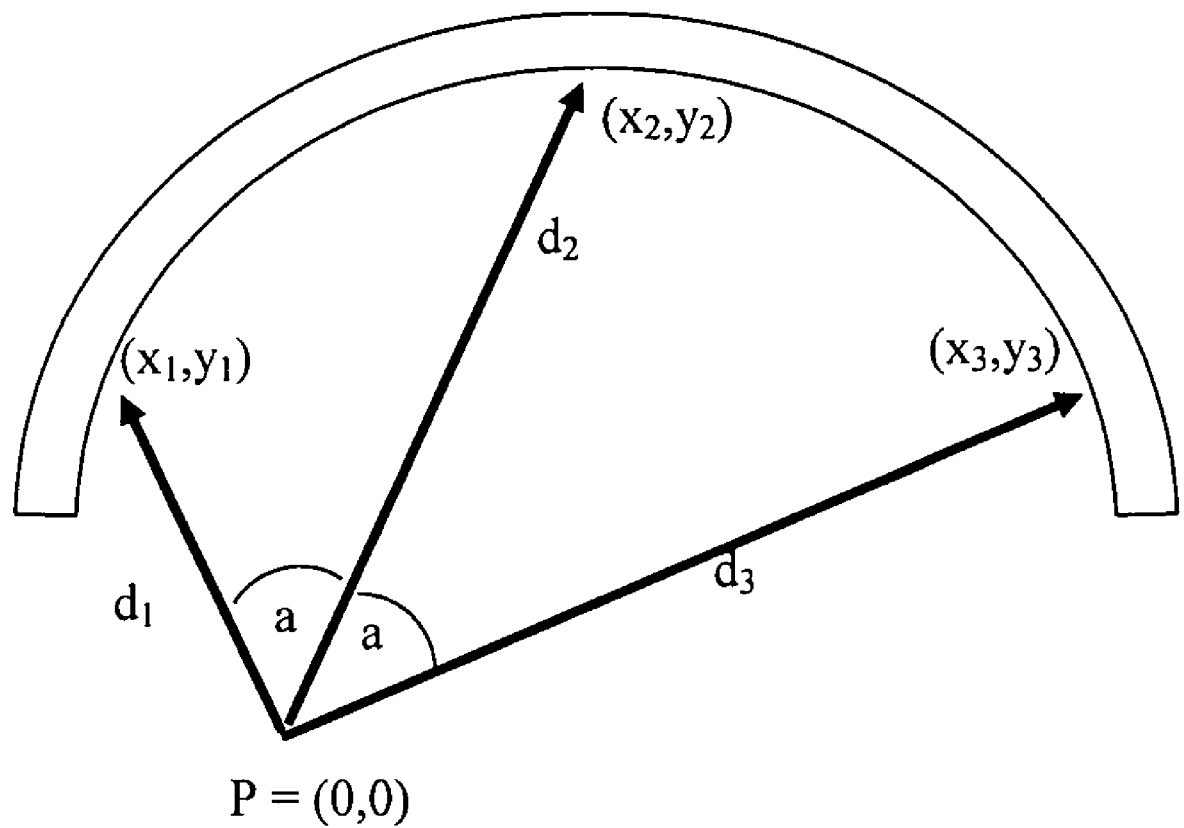
FIG. 4 is a schematic illustration of a second technique for measuring the radius of a curved surface.

The derivation of the radius of curvature, R, for the fully non-contact measurement device of FIG. 3 is described with reference to the schematic illustration of FIG. 4. In this example, the origin is set at the measurement device position, P, and the x-axis is oriented along the length $d_3$. The coordinates of the three points of measurement on the curved surface can thus be expressed as:

$$(x_1, y_1) = (d_1 \cos(2a), d_1 \sin(2a)) \quad \text{(Equation 2)}$$

$$(x_2, y_2) = (d_2 \cos(a), d_2 \sin(a)) \quad \text{(Equation 3)}$$

$$(x_3, y_3) = (d_3, 0) \quad \text{(Equation 4)}$$

Then, assuming the curve connecting the three points of contact is circular, one can solve for the circle defined by these three points. Beginning with the general equation of a circle:

$$(x-h)^2 + (y-k)^2 = r^2$$

h, k, and r can be solved in terms of $x_1, y_1, x_2, y_2, x_3, y_3$. Substituting in the three points $(x_1, y_1)$, $(x_2, y_2)$, and $(x_3, y_3)$ gives these three equations:

$$(x_1-h)^2 + (y_1-k)^2 = r^2$$

$$(x_2-h)^2 + (y_2-k)^2 = r^2$$

$$(x_3-h)^2 + (y_3-k)^2 = r^2$$

Multiplying these equations out yields these three equivalent equations:

$$x_1^2 - 2x_1 h + h^2 + y_1^2 - 2y_1 k + k^2 = r^2$$

$$x_2^2 - 2x_2 h + h^2 + y_2^2 - 2y_2 k + k^2 = r^2$$

$$x_3^2 - 2x_3 h + h^2 + y_3^2 - 2y_3 k + k^2 = r^2$$

Multiply the first by $(x_3-x_2)$, the second by $(x_1-x_3)$, and the third by $(x_2-x_1)$:

$$(x_1^2 - 2x_1 h + h^2 + y_1^2 - 2y_1 k + k^2)(x_3-x_2) = r^2(x_3-x_2)$$

$$(x_2^2 - 2x_2 h + h^2 + y_2^2 - 2y_2 k + k^2)(x_1-x_3) = r^2(x_1-x_3)$$

$$(x_3^2 - 2x_3 h + h^2 + y_3^2 - 2y_3 k + k^2)(x_2-x_1) = r^2(x_2-x_1)$$

Multiply out these three equations:

$$x_1^2 x_3 - x_1^2 x_2 - 2x_1 x_3 h + 2x_1 x_2 h + h^2 x_3 - h^2 x_2 + y_1^2 x_3 - y_1^2 x_2 - 2y_1 x_3 k + 2y_1 x_2 k + k^2 x_3 - k^2 x_2 = r^2 x_3 - r^2 x_2$$

$$x_2^2 x_1 - x_2^2 x_3 - 2x_2 x_1 h + 2x_2 x_3 h + h^2 x_1 - h^2 x_3 + y_2^2 x_1 - y_2^2 x_3 - 2y_2 x_1 k + 2y_2 x_3 k + k^2 x_1 - k^2 x_3 = r^2 x_1 - r^2 x_3$$

$$x_3^2 x_2 - x_3^2 x_1 - 2x_3 x_2 h + 2x_3 x_1 h + h^2 x_2 - h^2 x_1 + y_3^2 x_2 - y_3^2 x_1 - 2y_3 x_2 k + 2y_3 x_1 k + k^2 x_2 - k^2 x_1 = r^2 x_2 - r^2 x_1$$

Add them together, and all the squared h, k, and r terms cancel.

$$x_1^2 x_3 - x_1^2 x_2 + x_2^2 x_1 - x_2^2 x_3 + x_3^2 x_2 - x_3^2 x_1 + y_1^2 x_3 - y_1^2 x_2 + y_2^2 x_1 - y_2^2 x_3 + y_3^2 x_2 - y_3^2 x_1 - 2y_1 x_3 k + 2y_1 x_2 k - 2y_2 x_1 k + 2y_2 x_3 k - 2y_3 x_2 k + 2y_3 x_1 k = 0$$

Now we can solve for h and k. If we put all the "k" terms to one side, and solve:

$$x_1^2(x_3-x_2) + x_2^2(x_1-x_3) + x_3^2(x_2-x_1) + y_1^2(x_3-x_2) + y_2^2(x_1-x_3) + y_3^2(x_2-x_1) = 2k(y_1(x_3-x_2) + y_2(x_1-x_3) + y_3(x_2-x_1))$$

$$(x_1^2+y_1^2)(x_3-x_2) + (x_2^2+y_2^2)(x_1-x_3) + (x_3^2+y_3^2)(x_2-x_1) = 2k(y_1(x_3-x_2) + y_2(x_1-x_3) + y_3(x_2-x_1))$$

$$k = ((x_1^2+y_1^2)(x_3-x_2) + (x_2^2+y_2^2)(x_1-x_3) + (x_3^2+y_3^2)(x_2-x_1))/(2(y_1(x_3-x_2) + y_2(x_1-x_3) + y_3(x_2-x_1))) \quad \text{(Equation 5)}$$

We solve for h the same way:

$$h = ((x_1^2+y_1^2)(y_3-y_2) + (x_2^2+y_2^2)(y_1-y_3) + (x_3^2+y_3^2)(y_2-y_1))/(2(x_1(y_3-y_2) + x_2(y_1-y_3) + x_3(y_2-y_1))) \quad \text{(Equation 6)}$$

Now, to find $r^2$, we plug in "h" and "k" into one of the original equations:

$$r^2 = (x_1-h)^2 + (y_1-k)^2$$

and the radius of curvature, r, is:

$$r = sqrt[(x_1-h)^2 + (y_1-k)^2] \quad \text{(Equation 7)}$$

In the embodiment shown in FIG. 3, the measurement tool is designed such that the value of angles a and b are known quantities, and the values of distances $d_1$, $d_2$ and $d_3$ are measured by respective non-contact sensors, such as transmitter and receiver units 31, 32 and 33. In the case where sensors 31 and 32 are symmetric with respect to sensor 33, angle a is equal to angle b, and Equations 2, 3 and 4 can be used to determine the values of $x_1$, $y_1$, $x_2$, $y_2$, $x_3$ and $y_3$, based on the measured values of distances $d_1$, $d_2$ and $d_3$. Once these values have been calculated, the values of h and k can be solved for using Equations 5 and 6, and then the radius of curvature, r, can be calculated using Equation 7.

To perform a measurement, the measurement tool shown in FIG. 3 is held over the surface to be measured, and the three transmitter and receiver units, 31, 32, and 33, are activated to measure the respective distances from each transmitter and receiver unit to a point on the surface being measured. The measurement tool can be programmed to calculate the value of the radius of curvature based on these measured distances, using for example, Equations 5, 6 and 7 described above. The calculated radius value can then be displayed on display 25.

As with the previously described embodiment of FIG. 1, in the embodiment of FIG. 3, the transmitter and receiver units 31, 32 and 33 can comprise any suitable non-contact distance measuring device. The non-contact sensor can utilize, for example, acoustic or optical methods to measure distance. Furthermore, in a preferred embodiment, each of the transmitter and receiver units 31, 32 and 33 can also include a transmitter for transmitting a laser guidance beam onto the surface being measured to provide visual confirmation of the surface being measured.

An advantage of the embodiment of FIG. 3 is that the measuring device can measure the radius of curvature of a surface without making any contact with the surface being measured. This can be significant in terms of limiting possible damage or hazards in connection with the measurement of delicate, sterile or hazardous objects. The measurement can be performed by activating non-contact distance sensors, thus saving time and making the radius measuring tool very easy to use. In addition, non-contact sensors can be extremely precise, which improves the accuracy of the measuring device. There are generally no moving parts that can wear and eventually compromise accuracy. A further advantage of this embodiment is that there is an expanded range of radii values that can be measured, since the completely non-contact sensors provide a theoretical infinite range. Additionally, the design is very compact, compared to, for example, the device of FIG. 1.

Figure 5:
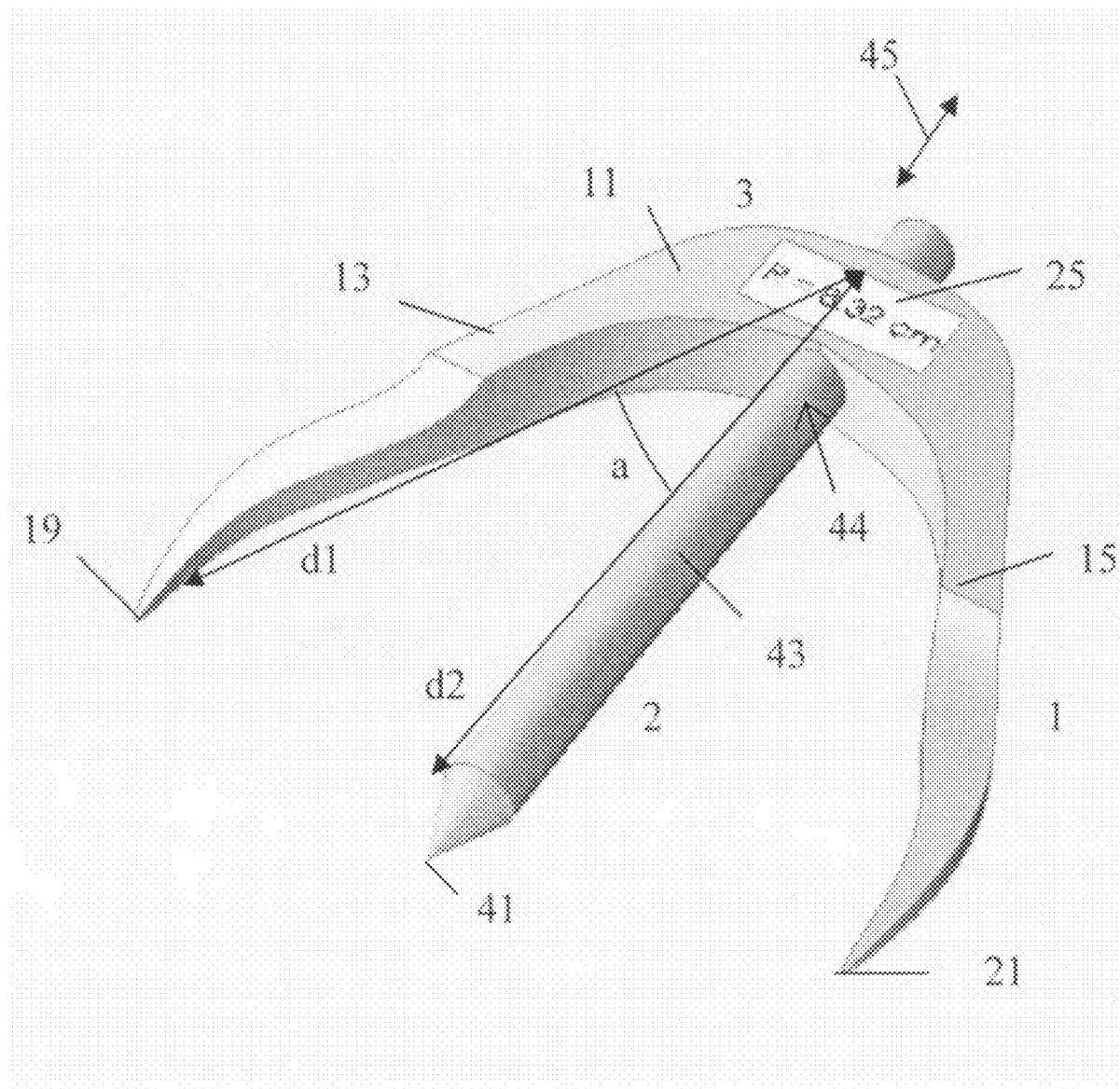
FIG. 5 is a perspective view of a third embodiment of a radius of curvature measuring device having an adjustable arm and a linear encoder.

FIG. 5 is a perspective view of a third embodiment of a radius of curvature measuring device 11 having an adjustable arm 43 and a linear encoder 44. This embodiment is similar to the embodiment of FIG. 1, where $d_1$ and angle a are fixed and the radius of curvature can be calculated based on the measured distance $d_2$. However, instead of using a transmitter and receiver unit to measure distance $d_2$, the embodiment of FIG. 5 uses an adjustable center arm 43 that is cooperatively associated with a linear encoder 44 that precisely measures the displacement of the arm 43 in the direction of arrow 45. During a radius of curvature measurement, the device 11 forms three points of contact with the surface being measured at points 19, 41 and 21. A precision linear encoder 44 tracks the position of the middle arm of the device and calculates the radius of curvature based on this distance ($d_2$) and the known distance $d_1$ and angle a. The radius of curvature in this embodiment can be calculated using, for example, Equation 1, as described above. The calculated radius of curvature can then be displayed on display 25, which can be, for example, an LCD display. One advantage of this device is the extremely precise distance measurements that can be provided by the linear encoder device.

Figure 6:
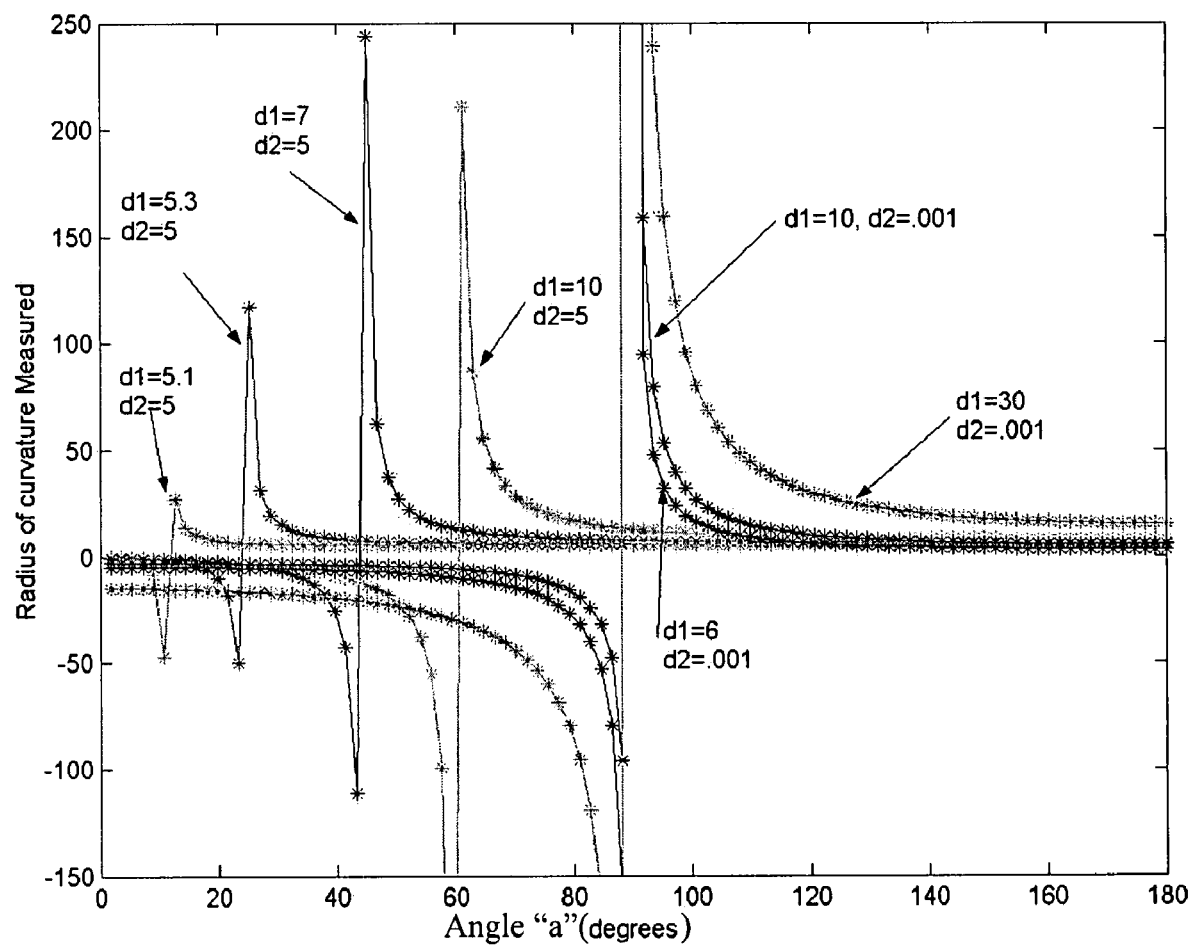
FIG. 6 is a graph illustrating the trade-offs between sensitivity and maximum measurable radius of curvature in the design of a measurement device such as shown in FIG. 5.

FIG. 6 illustrates the trade-offs between sensitivity and maximum measurable radius of curvature in the design of a measurement device such as shown in FIG. 5. In a measurement tool that makes three points of contact with the surface being measured, one design goal is to select the appropriate lengths of $d_1$ and $d_2$ to localize the sensitivity of the instrument to the range of expected radius of curvatures in the given application or industry. To summarize, creating very unequal arm lengths creates a broader range and greater maximum measurable radius of curvature but decreases the instrument's sensitivity (a small change in angle, a, creates a large change in R, so that small changes in R are difficult to measure). In contrast, making the arm lengths very similar in length creates a very sensitive measurement range (R changes very little with change angle so that slight changes in R can be measured) but a limited maximum radius of curvature and a limited range of radii of curvatures that can be measured.

While this invention has been particularly shown and described with references to example embodiments thereof, it will be understood by those skilled in the art that various changes in form and details may be made therein without departing from the scope of the invention encompassed by the appended claims.

What is claimed is:

1. A device for measuring the radius of curvature of a surface, comprising:
    a main body that is held above the surface being measured;
    three non-contact sensors mounted to the main body, the three non-contact sensors comprising a central non-contact sensor mounted to the main body and a pair of peripheral non-contact sensors mounted to the main body at an angle, a, relative to the central sensor and symmetric with respect to the main sensor, the central sensor configured to measure distinct, independent distance $d_2$ of a line extending from point $(x_2,y_2)$ on the surface being measured to point P and the pair of peripheral non-contact sensors configured to measure distinct, independent distances ($d_1$ and $d_3$) of two lines extending from respective points $[(x_1, y_1), (x_3, y_3)]$ on the surface being measured and converging at point P; and
    a computer processor mounted to the main body and configured to receive the distinct, independent measured distances $d_1$, $d_2$ and $d_3$ and to calculate a radius of curvature of the surface based on the distinct, independent measured distances $d_1$, $d_2$, and $d_3$.

2. The device of claim 1, further comprising:
    a display mounted to the main body that displays the calculated radius of curvature.

3. The device of claim 1, wherein the three non-contact sensors comprise acoustical distance sensors.

4. The device of claim 1, wherein the three non-contact sensors comprise optical distance sensors.

5. The device of claim 4, wherein the optical sensors use at least one of time-of-flight, triangulation, modulated beam, and interferometery methods for measuring distance.

6. The device of claim 1, further comprising transmitters for transmitting visible light beams from points near or at the non-contact sensors to provide visual confirmation of the surface being measured.

7. The device of claim 1, wherein the values of distances $d_1$, $d_2$, $d_3$ and angle, a, are known or measured values, and the location of points $(x_1, y_1)(x_2, y_2), (x_3, y_3)$ are determined relative to P, and the radius of curvature of the surface is calculated from the equation of the circle containing points $(x_1, y_1), (x_2, y_2)$ and $(x_3, y_3)$.

8. A method for measuring the radius of curvature of a surface, comprising:
    positioning a main body having three non-contact sensors above the surface being measured, the three non-contact sensors comprising a central non-contact sensor mounted to the main body and a pair of peripheral non-contact sensors mounted to the main body at an angle, a, relative to the central sensor and symmetric with respect to the main sensor;
    using the central non-contact sensor, measuring distinct, independent distance $d_2$ of a line extending from point $(x_2, y_2)$ on the surface being measured to point P;
    using the pair of peripheral non-contact sensors, measuring distinct, independent distances ($d_1$ and $d_3$) of two lines extending from respective points $[(x_1, y_1), (x_3, y_3)]$ on the surface being measured and converging at point P; and
    calculating a radius of curvature of the surface based on the distinct, independent measured distances $d_1$, $d_2$, and $d_3$.

9. The method of claim 8, further comprising:
    displaying the calculated radius of curvature on a display mounted to the main body.

10. The method of claim 8, wherein the three non-contact sensors comprise acoustical distance sensors.

11. The method of claim 8, wherein the three non-contact sensors comprise optical distance sensors.

12. The method of claim 11, wherein the optical sensors use at least one of time-of-flight, triangulation, modulated beam, and interferometery methods for measuring distance.

13. The method of claim 8, further comprising:
    transmitting visible light beams from points near or at the non-contact sensors to provide visual confirmation of the surface being measured.

* * * * *